July 27, 1954  F. A. HESTER  2,685,056
SYNCHRONIZABLE VIBRATOR-TYPE INVERTER
Filed Aug. 31, 1949
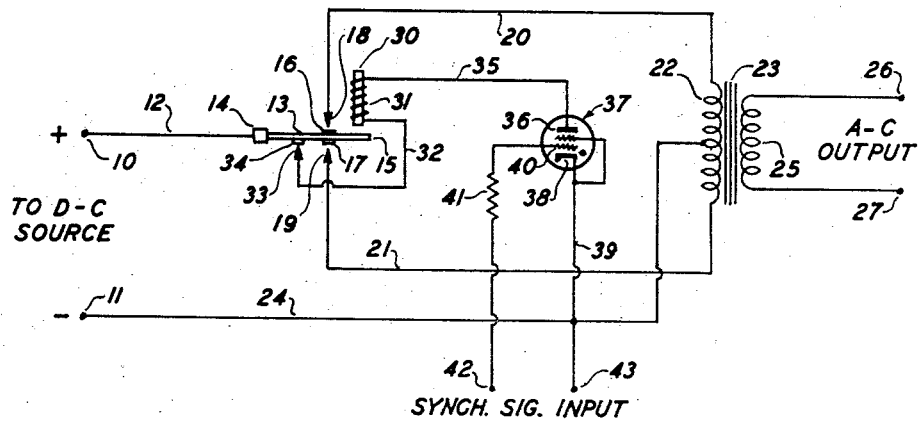
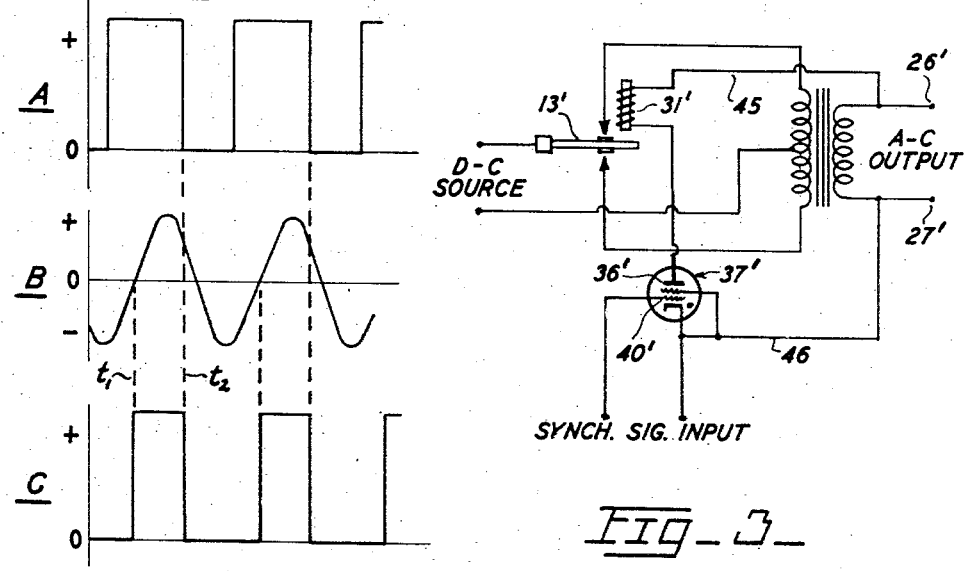
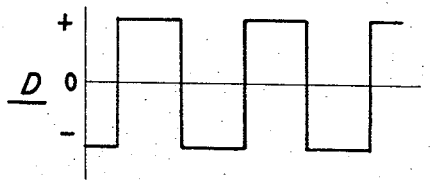
INVENTOR.
FRANK A. HESTER
BY
Carl V. Olson
ATTORNEY Patented July 27, 1954

2,685,056

UNITED STATES PATENT OFFICE 2,685,056

SYNCHRONIZABLE VIBRATOR-TYPE INVERTER

Frank A. Hester, New York, N. Y., assignor to Faximile, Inc., New York, N. Y., a corporation of Delaware Application August 31, 1949, Serial No. 113,418

8 Claims. (Cl. 321—49)

1

This invention relates to vibrator-type inverters for converting direct current into alternating current and more particularly to inverters which may be synchronized with an external signal.

This invention is particularly useful in a transmission system where mechanical motion at the receiving end must be kept in exact synchronism with equivalent motion at the sending end. Facsimile systems for the transmission of graphic material by wire or radio ordinarily include a rotating drum or helix electrode at the receiving end which must be kept in synchronism with the transmitter apparatus. When both the transmitter and receiver cannot be powered by a common alternating-current source, synchronous operation of the equipments may be achieved by the transmission of a synchronizing pulse which is used at the receiver to control the speed of the recorder cylinder or helix marking electrode. A system of this type, wherein the received synchronizing pulses are employed to control a variable-frequency oscillator the output of which is amplified sufficiently to power a driving motor, is described in my copending application Serial No. 107,161, filed July 28, 1949. Electronic power amplifiers capable of driving electric motors are very satisfactory in operation but are expensive to make. As with radio and television, the widespread use of facsimile depends on low-cost equipment. It is therefore the principal object of this invention to provide a low-cost power amplifier receptive to a synchronizing control signal and capable of supplying A.-C. power to drive a motor in synchronism with the control signal.

It is another object to provide a vibrator-type inverter the period of which may be positively controlled within a substantial range of values on either side of the natural period of its vibratory reed.

It is a further object to provide a device for translating D.-C. power into A.-C. power having a frequency determined by a relatively weak synchronizing signal.

Pursuant to these and other objects which will be apparent to those skilled in the art, a synchronizable vibrator-type inverter is provided having a control tube electrically in series with the coil of the electromagnet acting on the vibrator reed. A synchronizing signal applied to the control electrode of the tube controls the current through the tube and likewise through the coil of the magnet. The frequency of oscillation of the vibrator reed and of the output current is

2 thereby maintained in synchronism with the synchronizing signal.

For a better understanding of the invention, reference is had to the following detailed description taken in conjunction with the appended drawings showing two presently preferred forms of the invention.

In the drawings:

Fig. 1 is a schematic diagram of one form of the invention.

Fig. 2 is a graph illustrating current and voltage conditions at various points in the circuit of Fig. 1.

Fig. 3 is a schematic diagram of a second form of the invention.

Referring now in greater detail to Figs. 1 and 2, terminals 10 and 11 are connected to a D.-C. power source which may, for example, be a conventional transformer-rectifier-filter device energized from a 60-cycle power main. Terminal 10 is connected by wire 12 to a vibrator reed 13 fixed at end 14 and free at end 15. Contacts 16 and 17 on vibratory reed 13 cooperate with fixed contacts 18 and 19, respectively, which are connected by wires 20 and 21 to opposite ends of the primary winding 22 of output transformer 23. D.-C. power terminal 11 is connected by wire 24 to the centertap of primary winding 22. Transformer 23 is provided with a secondary winding 25 connected to output terminals 26 and 27.

In operation, as vibratory reed 13 oscillates, the centertap of primary winding 22 is maintained in contact with negative D.-C. terminal 11 while the ends of winding 22 are alternately connected through contacts 16, 17, 18 and 19 and reed 13 to the positive D.-C. terminal 10. A substantially square-wave alternating current is induced in secondary winding 25 and supplied to output terminals 26 and 27, from which it may be taken for use as in powering an A.-C. motor.

The vibratory reed 13 is maintained in oscillation by means of an operating circuit including an electromagnet having a magnetic core 30 and coil 31. One end of coil 31 is connected through wire 32 to stationary contact 33 disposed to cooperate with an operating circuit contact 34 on vibratory reed 13. The other end of coil 31 is connected by wire 35 to the plate or anode 36 of a control tube 37. The cathode 38 of tube 37 is connected by wires 39 and 24 to the negative D.-C. terminal 11. The grid or control electrode 40 of tube 37 is connected through grid resistor 41 to a synchronizing signal input terminal 42, the other terminal 43 being connected to the cathode 38 of tube 37. Control tube 37 is preferably operated as a switch tube and is preferably a thyratron.

In operation, when D.-C. power is initially applied to terminals 10 and 11, current flows from terminal 10 through normally-closed operating contacts 33 and 34, electromagnet coil 31, and control tube 37 to terminal 11. Electromagnet 30, 31 acts on end 15 of reed 13 so that contacts 33, 34 are opened and contacts 16, 18 are closed. Vibratory element 13 then continues oscillating. Whenever contacts 33, 34 close, positive voltage is applied to anode 36 of tube 37, the voltage being as represented by Curve A of Fig. 2. The synchronizing signal applied through terminals 42, 43 to the grid 40 of tube 37 may be as represented by Curve B of Fig. 2. Tube 37 may be operated so that it will conduct only when there is a positive voltage on grid 40. Curve C of Fig. 2 is derived from Curves A and B and it shows the current flowing through tube 37. At time $t_1$ tube 37 starts conducting because of the simultaneous presence of plate voltage and positive grid voltage. At time $t_2$ tube 37 stops conducting because of the removal of plate voltage occasioned by the opening of contacts 33, 34 of the vibratory switch, i. e., the vibratory reed 13 and its associated contacts. When current flows through tube 37 it, of course, also flows through the series connected coil 31 of the electromagnet and causes a magnetic force to be exerted on vibratory reed 13. Since vibratory reed 13 has mechanical inertia, contacts 16, 18 will be closed for as long a period as contacts 17, 19 so that the output voltage will be a symmetrical square wave as represented by Curve D of Fig. 2.

It will be understood that the curves of Fig. 2 are presented for the purpose of explaining the operation of the invention and that the exact form of the curves will depend on the physical disposition of the fixed and moving contacts of the vibratory switch and the operating conditions of the control tube. It will be noted that control tube 37 acts as a switch in series with contacts 33, 34, so that there is either full current or no current flowing through coil 31 of the electromagnet. This completely distinguishes the circuit from one, such as that shown in Pat. No. 2,292,630 of August 11, 1942 to W. W. Garstang, wherein the synchronizing current is added to or subtracted from the magnitude of the operating current normally flowing through the electromagnet coil.

In the present invention, the control tube automatically adjusts the duration of time that full current flows through the electromagnet coil during each cycle to a value such that the vibratory reed 13 is maintained in synchronism with the synchronizing signal. Synchronism is maintained because if the vibrator reed slows down, plate voltage is applied to the control tube, and electromagnetic force is applied to the reed, for a longer period of time, thus speeding up the reed. Conversely, if the reed speeds up, a decrease in the period of time that electromagnetic force is exerted results in a slowing down of the reed. By virtue of the arrangement whereby the tube passes full current or no current through coil 31, a more positively locked-in synchronization is achieved than previously has been possible.

Reference will now be made to Fig. 3 which shows a form of the invention differing from that shown in Fig. 1 in that the series combination of electromagnet coil 31' and control tube 37' is connected by wires 45 and 46 across the output terminals 26' and 27' rather than in series with contacts 33, 34 across the D.-C. power source.

In operation, the output voltage is synchronous in period and phase with the vibratory reed 13.' Since control tube 37' is a unidirectional device, positive plate voltage is applied to the tube only during a half of the A.-C. power output cycle. Current flows through the tube 37' and the operating coil 31' only when there is positive voltage on plate 36' of the tube and an above-cutoff synchronizing voltage on the grid 40'. The duration of time during each cycle that current flows through operating coil 31' is therefore controlled by the synchronizing signal applied to grid 40' of tube 37'. The duration of the magnetic force acting on reed 13' during each cycle is automatically adjusted to maintain the reed in synchronism with the synchronizing signal.

The form of the invention as represented in Fig. 3 is normally not self-starting, it being necessary to give the vibratory reed an initial swing manually.

It will be understood that while two forms of the invention have been shown and described in some detail, this has been done by way of illustration and not limitation, and that the scope of the invention is to be construed by reference to the appended claims.

What is claimed is:

1. A synchronizable vibrator-type inverter comprising: a vibratory switch including a plurality of pairs of fixed and movable contacts, a source of direct current connected to certain contacts of said switch; a synchronized alternating current output circuit connected to other contacts of said switch; means for maintaining the movable contacts in an oscillating condition including, in series circuit across the source of direct current, a pair of contacts of said switch, an electromagnet coil and a pair of electrodes of a switch tube, said tube also including a control electrode; and means for applying a synchronizing signal to said control electrode to control the current therethrough and consequently the frequency of oscillation of the movable contacts.

2. A current converter having an output synchronizable continuously with a periodic control signal comprising a switch having fixed and movable contacts, a source of direct current connected to certain of said contacts, an electromagnet having a coil and disposed for actuating the movable contacts, a control tube having a pair of electrodes in series circuit with the said coil and source of direct current, said tube also including a control electrode, and means for applying the control signal to the control electrode, whereby the movable contacts are periodically actuated only in synchronism with the control signal.

3. A current converter including a circuit for continuously controlling the periodic current output thereof, comprising a switch having fixed and movable contacts, a source of direct current, an electromagnet having a coil and disposed for actuating the movable contacts, a control tube having a cathode, anode, and control electrode, said coil being connected in series with said cathode, anode, direct current source, and certain of said contacts; and a periodic control signal source connected to said control electrode, whereby the said periodic current output is continuously synchronized with the periodic control signal and is obtained only in synchronism with said control signal.

4. A current converter circuit operable responsively to a periodic control signal, comprising a source of direct current, a switch having a vibratable element connected with said source, an electromagnet for actuating the vibratable element and having a coil, a switching device having a pair of electrodes connected in series circuit with the said coil, vibratable element, and source of direct current; said switching device also including a control electrode; and means for applying said control signal to said control electrode, whereby the vibratable element is actuatable only in synchronism with said control signal.

5. A current converter having a periodic current output synchronizable with a periodic control signal, comprising: a source of direct current; means for converting the direct current to said periodic current output, said means including a vibratory switch having a plurality of fixed and movable contacts constituting pairs of terminals of said switch, an electromagnet having a coil disposed to actuate said movable contacts, and a transformer including at least one winding having a pair of terminals to provide said periodic current output, said source of direct current being connected to certain of said contacts and said transformer; and a switching device having input and output electrodes connected in series with said coil and one pair of said terminals; said switching device also including a control electrode for connection thereto of a source of said periodic control signal.

6. A current converter according to claim 5, wherein said input and output electrodes and said coil are connected in series with a pair of said fixed and movable contacts.

7. A current converter according to claim 5, wherein said input and output electrodes are connected in series with said coil and said winding.

8. A current converter according to claim 5, wherein said switching device is a control tube having a cathode, anode, and control electrode.

References Cited in the file of this patent

UNITED STATES PATENTS

| Number | Name | Date |
|---|---|---|
| 1,809,832 | Curtis | June 16, 1931 |
| 1,977,256 | Swart | Oct. 16, 1934 |
| 2,188,159 | Rockwood | Jan. 23, 1940 |
| 2,208,400 | Steinmetz | July 16, 1940 |
| 2,279,007 | Mortley | Apr. 7, 1942 |
| 2,292,630 | Garstang | Aug. 11, 1942 |
| 2,415,944 | Fagen | Feb. 18, 1947 |

FOREIGN PATENTS

| Number | Country | Date |
|---|---|---|
| 290,298 | Great Britain | July 26, 1928 |
| 862,393 | France | Nov. 30, 1940 |